US011509259B2

(12) United States Patent
Liu et al.

(10) Patent No.: US 11,509,259 B2
(45) Date of Patent: Nov. 22, 2022

(54) PLATE FOLDING AND UNFOLDING DEVICE AND SOLAR PANEL STRUCTURE

(71) Applicant: SHENZHEN KUANG-CHI SPACE TECH. CO., LTD., Guangdong (CN)

(72) Inventors: Ruopeng Liu, Guangdong (CN); Lin Luan, Guangdong (CN); Junjie Liao, Guangdong (CN)

(73) Assignee: SHENZHEN KUANG-CHI SPACE TECH. CO., LTD., Guangdong (CN)

( * ) Notice: Subject to any disclaimer, the term of this patent is extended or adjusted under 35 U.S.C. 154(b) by 816 days.

(21) Appl. No.: 16/398,060

(22) Filed: Apr. 29, 2019

(65) Prior Publication Data

US 2019/0260331 A1    Aug. 22, 2019

Related U.S. Application Data

(63) Continuation of application No. PCT/CN2017/092057, filed on Jul. 6, 2017.

(30) Foreign Application Priority Data

Oct. 31, 2016    (CN) .......................... 201610930568.2

(51) Int. Cl.
*H02S 30/20* (2014.01)
*B64G 1/22* (2006.01)
(Continued)

(52) U.S. Cl.
CPC .............. *H02S 30/20* (2014.12); *B64G 1/222* (2013.01); *B64G 1/443* (2013.01); *B64G 1/66* (2013.01); *F16C 11/10* (2013.01); *E05D 11/1014* (2013.01)

(58) Field of Classification Search
CPC ............ E05D 11/1028; E05D 11/1064; E05D 2011/1035; E05D 11/105; E05D 11/06;
(Continued)

(56) References Cited

U.S. PATENT DOCUMENTS 3,849,834 A * 11/1974 Mayer ................ E05D 11/1028
16/332
4,880,188 A * 11/1989 Roth ..................... B64G 1/222
244/172.6
(Continued)

FOREIGN PATENT DOCUMENTS

CN       104608941 A    5/2015
CN       206288255 U    6/2017
(Continued)

OTHER PUBLICATIONS

International Search Report dated Sep. 30, 2017 issued in PCT/CN2017/092057.

*Primary Examiner* — Philip J Bonzell
*Assistant Examiner* — Michael B. Kreiner
(74) *Attorney, Agent, or Firm* — Armstrong Teasdale LLP (57) ABSTRACT

A plate folding and unfolding device and a solar panel structure are provided. The plate folding and unfolding device includes a cam fixed with first plate piece, and a rotating shaft is disposed inside the cam in an axial direction of the cam; a connecting rod, where the connecting rod includes a first end and a second end that are opposite to each other, the first end is connected vertically to the rotating shaft, and the second end is fixed to a second plate piece; a positioning shaft, where the positioning shaft is disposed, on the connecting rod; and an elastic piece, where the elastic piece is disposed on the connecting rod, one end of the elastic piece is connected to the positioning shaft, where a groove that accommodates the positioning shaft is disposed at at least one location of the outer peripheral surface of the cam.

19 Claims, 5 Drawing Sheets

(51) Int. Cl.
  *B64G 1/44* (2006.01)
  *B64G 1/66* (2006.01)
  *F16C 11/10* (2006.01)
  *E05D 11/10* (2006.01)

(58) Field of Classification Search
  CPC .......... B64G 1/222; B64G 1/443; B64G 1/44; H02S 30/20
  See application file for complete search history.

(56) References Cited

U.S. PATENT DOCUMENTS

| | | | | |
|---|---|---|---|---|
| 5,037,043 | A * | 8/1991 | Roth | H02S 99/00 244/172.6 |
| 5,393,018 | A * | 2/1995 | Roth | F16C 11/103 244/172.6 |
| 5,509,747 | A * | 4/1996 | Kiendl | F16H 37/126 244/172.6 |
| 5,785,280 | A * | 7/1998 | Baghdasarian | B64G 1/222 244/172.6 |
| 5,826,832 | A * | 10/1998 | Stich | H02S 30/20 244/172.6 |
| 5,911,536 | A * | 6/1999 | Roth | B64G 1/44 244/172.6 |
| 6,010,096 | A * | 1/2000 | Baghdasarian | B64G 1/443 244/172.6 |
| 6,488,435 | B1 * | 12/2002 | Janson | B64G 1/222 244/172.6 |
| 6,993,808 | B1 * | 2/2006 | Bennett | A61F 5/0125 16/334 |
| 7,905,591 | B2 * | 3/2011 | Strobel | G02C 5/08 351/63 |
| 8,752,247 | B2 * | 6/2014 | Franchini | E05D 11/105 16/334 |

FOREIGN PATENT DOCUMENTS

| | | |
|---|---|---|
| GB | 1382446 A | 1/1975 |
| GB | 2329930 A | 4/1999 |
| JP | 60244700 A | 12/1985 |
| JP | 2001097293 A | 4/2001 |
| KR | 101291593 B1 | 8/2013 |

* cited by examiner

PLATE FOLDING AND UNFOLDING DEVICE AND SOLAR PANEL STRUCTURE

CROSS-REFERENCE TO RELATED APPLICATIONS

This application is a continuation application of PCT/CN2017/092057, filed Jul. 6, 2017, published as WO 2018/076780, which claims priority to Chinese Application No. 201610930568.2, filed Oct. 31, 2016. The above-identified applications are incorporated by reference herein in their entireties.

TECHNICAL FIELD

The present disclosure relates to the field of mechanical connection of a plate, and more specifically, to a plate folding and unfolding device and a solar panel structure.

BACKGROUND

Currently, in fields such as livelihood, military, and aerospace, plates such as laptop computers, solar panel substrates, and antenna array substrates all need to work through folding and unfolding of two plate pieces. The two plate pieces generally need to be connected by using a plate folding and unfolding device, and are locked when the two plate pieces are unfolded to a predetermined angle.

Using a solar panel substrate in a spacecraft as an example, a commonly used plate folding and unfolding device in the prior art uses a cam and shaft pin mechanism. For two adjacent panels A and B, a cam is fixed on the panel A, and a shaft pin is fixed on the panel B. The shaft pin is connected to a rotating shaft at the center of the cam by using two connecting rods. When the two panels are unfolded to a predetermined angle, the shaft pin rotates around the cam and slides to a groove disposed on a periphery of the cam, so that the angle between the panel A and the panel B is locked.

Technical Problem

When the foregoing cam and shaft pin mechanism is used as the plate folding and unfolding device, both a size of the cam and length design of the two connecting rods need to be considered. If a length of the connecting rods is not calculated accurately advance, this may easily result in that the shaft pin fails to rotate into the groove. When a size design of the cam is changed, respective lengths of the two connecting rods also need to be redesigned.

SUMMARY

Solution to Problem

Technical Solution

For the foregoing issue, the present embodiments intend to provide a plate folding and unfolding device and a solar panel substrate. The plate folding and unfolding device and the solar panel substrate make locking of two connected plate pieces at a predetermined angle much easier at a more accurate location. When cams of different sizes are used, the plate folding and unfolding device does not need to be modified entirely, reducing the design workload.

According to one aspect of the present disclosure, a plate folding and unfolding device is provided, including: a cam, where the cam is fixed to a first plate piece, and a rotating shaft is disposed inside the cam in an axial direction of the cam; a connecting rod, where the connecting rod includes a first end and a second end that are opposite to each other, the first end is connected vertically to the rotating shaft, and the second end is fixed to a second plate piece, so that the second plate piece and the first plate piece fold or unfold around the rotating shaft; a positioning shaft, where the positioning shaft is disposed, parallel to the rotating shaft, on the connecting rod, and the positioning shaft rotates along with the connecting rod and can move back and forth in a radial direction of the cam; and an elastic piece, where the elastic piece is disposed on the connecting rod, one end of the elastic piece is connected to the positioning shaft, so that the positioning shaft fits closely to an outer peripheral surface of the cam, where a groove that accommodates the positioning shaft is disposed at at least one location of the outer peripheral surface of the cam.

In one embodiment, the positioning shaft includes a first state in which the positioning shaft fits closely to the outer peripheral surface of the cam and a second state in which the positioning shaft is located in the groove; and when the second plate piece and the first plate piece are completely folded, the positioning shaft is in the first state; or when the second plate piece and the first plate piece are unfolded to a predetermined angle, the positioning shaft is in the second state, and the location of the groove corresponds to a location of the positioning shaft when the second plate piece and the first plate piece are unfolded to the predetermined angle.

In one embodiment, the location of the groove corresponds to a location of the positioning shaft when the second plate piece and the first plate piece are unfolded to 180 degrees.

In one embodiment, the plate folding and unfolding device further includes: a stationary shaft, where the stationary shaft fixes the second end of the connecting rod to the second plate piece.

In one embodiment, the connecting rod includes a first connecting rod and a second connecting rod, and the first connecting rod and the second connecting rod are disposed symmetrically on two sides of the cam and are respectively connected to two opposite ends of the rotating shaft.

In one embodiment, the elastic piece is a spring, one end of the spring is connected to the positioning shaft, and the other end is fixed to the connecting rod.

In one embodiment, the plate folding and unfolding device further includes: a space disposed on the connecting rod for accommodating the spring, where the space extends, from a location of the positioning shaft when the positioning shaft is in the first state, by a specific length in a direction towards the first end of the connecting rod, and a side wall is provided at the terminal point of the extension; and the spring is an extension spring, one end of the extension spring is connected to the positioning shaft, and the other end is fixed to the side wall.

In one embodiment, the elastic piece is a spring plate, the spring plate is located on one side of the connecting rod, one end of the spring plate is connected to the positioning shaft, and the other end abuts against the stationary shaft.

In one embodiment, an outline of an axial cross section of the cam is in any one of a round shape, an oval shape, or an involute shape.

In one embodiment, the plate is one of a solar panel, an antenna array substrate, or a laptop computer.

According to another aspect of the present embodiments, a solar panel structure is provided, which is disposed in a spacecraft and includes: a first panel; a second panel; and the foregoing plate folding and unfolding device, where the cam of the plate folding and unfolding device is fixed to the first panel, and the second end of the connecting rod is fixed to the second panel, so that the second panel and the first panel fold or unfold around the rotating shaft.

Beneficial Effect of Present Disclosure

Beneficial Effect

According to the plate folding and unfolding device and the solar panel structure of the present embodiments, the positioning shaft fits closely to the outer peripheral surface of the cam by using the elastic piece, and the positioning shaft can roll into the groove on the outer peripheral surface of the cam when two connected plate pieces are unfolded to a predetermined angle, making locking much easier and a location more accurate. In addition, when cams of different sizes are used, the original connecting rod, positioning shaft, elastic piece, and the like can continue to be used without requiring modifying the entire plate folding and unfolding device, thereby reducing the design workload.

BRIEF DESCRIPTION OF DRAWINGS

Description of Drawings

The foregoing and other objectives, features, and advantages of the present embodiments will become clearer through the following descriptions of the embodiments of the present embodiments with reference to the accompanying drawings. In the accompanying drawings.

DESCRIPTION OF EMBODIMENTS

Embodiments of Present Disclosure

The following describes the present embodiments in more details with reference to the drawings. In the accompanying drawings, same elements are denoted using same reference numerals. For brevity, parts in the accompanying drawings are not drawn in proportion. In addition, some well-known part may not be illustrated.

It should be understood that when a structure of a component is described, a layer or an area described as being located "on" or "above" another layer or another area may mean that the layer or the area is directly located on the another layer or the another area or another layer or area may be further included between the layer or the area and the another layer or the another area. In addition, if the component is turned over, the layer or the area may be located "beneath" or "under" the another layer or the another area.

If a situation of being directly located on another layer or another area is descried, this application uses the expression that "A is directly located on B" or "A is located on B and borders on B". In this application, "A is located directly in B" represents that A is located in B, and A directly boards on B.

Figure 1:
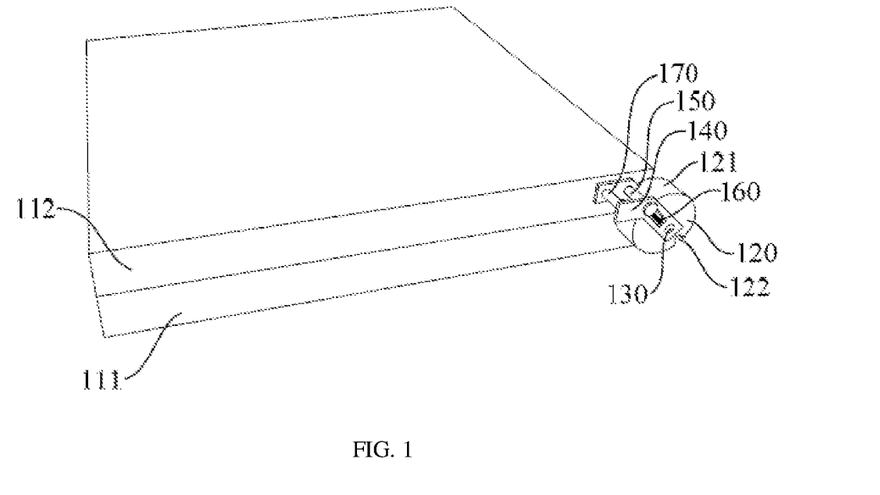
FIG. 1 shows a space diagram of a plate folding and unfolding device according to a first embodiment of the present embodiments when the device is folded.
Figure 2:
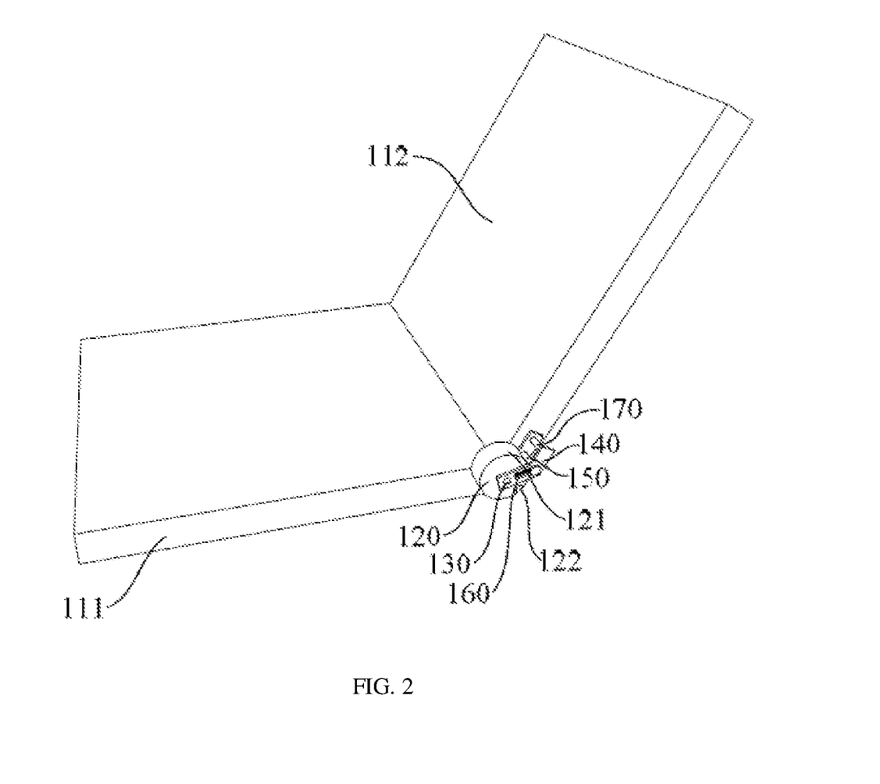
FIG. 2 shows a space diagram of a plate folding and unfolding device according to a first embodiment of the present embodiments when the device is unfolded.
Figure 3:
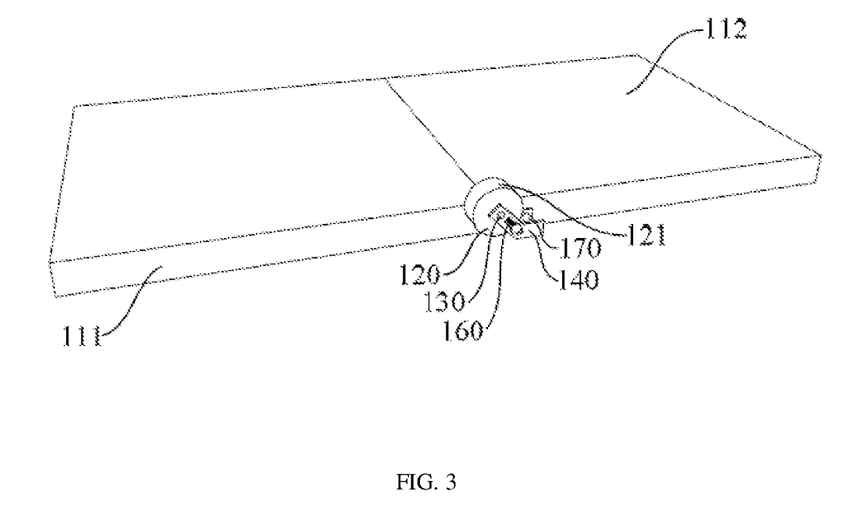
FIG. 3 shows a space diagram of a plate folding and unfolding device according to a first embodiment of the present embodiments when the device is clocked.
Figure 4:
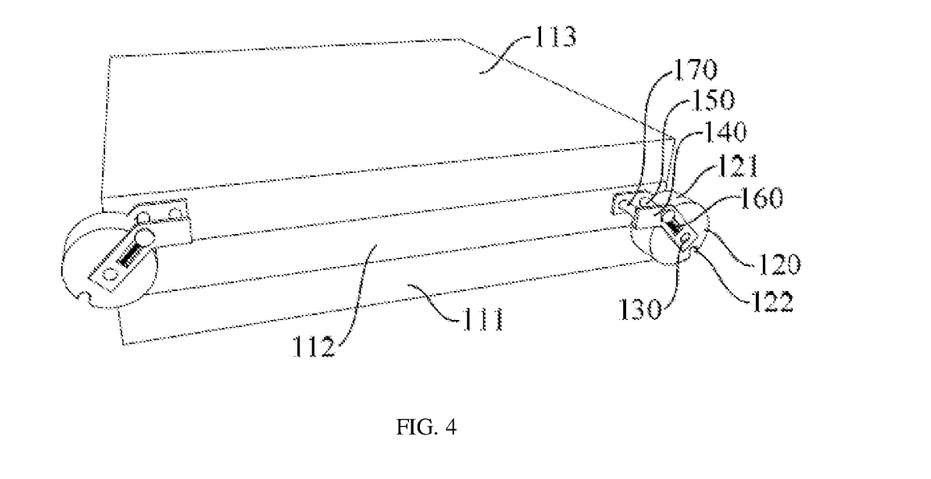
FIG. 4 shows a space diagram of multi-level connection of a plate folding and unfolding device according to a first embodiment of the present embodiments.
Figure 5:
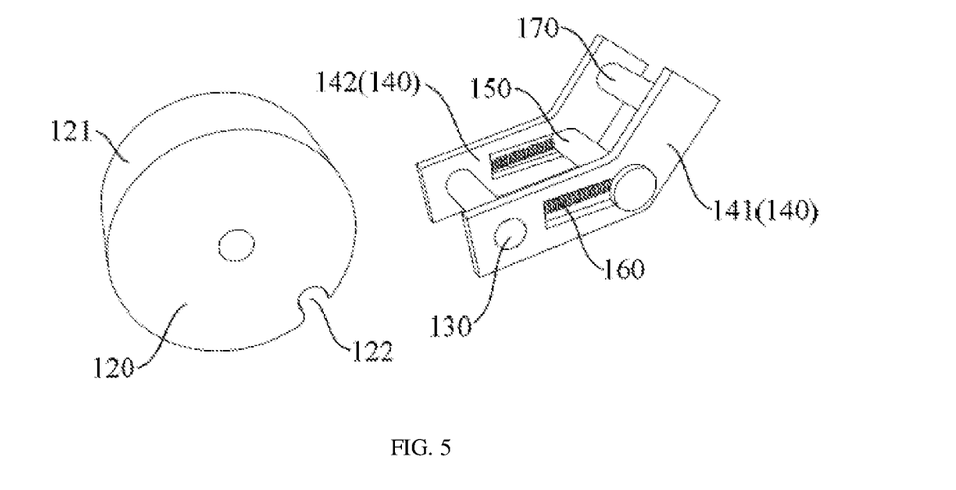
FIG. 5 shows an exploded structural view of a plate folding and unfolding device according to a first embodiment of the present embodiments.

FIG. 1 to FIG. 5 show a plate folding and unfolding device according to a first embodiment of the present embodiments. FIG. 1 to FIG. 3 respectively show space diagrams of the plate folding and unfolding device when the device is folded, unfolded, and locked. FIG. 4 shows a space diagram of the plate folding and unfolding device when the device is applied to multi-level connection of multiple plate pieces. FIG. 5 shows an exploded structural view of the plate folding and unfolding device. The plate folding and unfolding device includes: a cam 120, a connecting rod 140, a positioning shaft 150, and an elastic piece 160. The cam 120 is fixed to a first plate piece 111, and a rotating shaft 130 is disposed inside the cam 120 in an axial direction of the cam 120. The connecting rod 140 includes a first end and a second end that are opposite to each other, the first end is connected vertically to the rotating shaft 130, and the second end is fixed to a second plate piece 112, so that the second plate piece 112 and the first plate piece 111 fold or unfold around the rotating shaft 130. The positioning shaft 150 is disposed, parallel to the rotating shaft 130, on the connecting rod 140, and the positioning shaft 150 rotates along with the connecting rod 140 and can move back and forth in a radial direction of the cam 120. The elastic piece 160 is disposed on the connecting rod 140, and one end of the elastic piece 160 is connected to the positioning shaft 150, so that the positioning shaft 150 fits closely to an outer peripheral surface 121 of the cam 120, where a groove 122 that accommodates the positioning shaft 150 is disposed at at least one location of the outer peripheral surface 121 of the cam 120.

An outline shape of an axial cross section of the cam 120 is in any one of a round shape, an oval shape, or an involute shape that has a smooth curve shape. In present embodiments, the round shape is used as an example for description, and the rotating shaft 130 is located on the central axis of the round-shaped cam 120.

The positioning shaft 150 includes a first state in which the positioning shaft 150 fits closely to the outer peripheral surface 121 of the cam 120 and a second state in which the positioning shaft 150 is located in the groove 122 of the cam 120. When the second plate piece 112 and the first plate piece 111 are completely folded, the positioning shaft 150 is in the first state, as shown in FIG. 1. When the second plate piece 112 and the first plate piece 111 are unfolded, as shown in FIG. 2, the positioning shaft 150 is still pressed closely against the outer peripheral surface 121 of the cam 120. When the second plate piece 112 and the first plate piece 111 continue to be unfolded, as shown in FIG. 3, to a predetermined angle, the positioning shaft 150 corresponds to the location of the groove 122, and the positioning shaft 150 rolls into or slides into the groove 122 under an action of the elastic piece 160. In this case, the positioning shaft 150 is in the second state. Therefore, the location of the groove 122 corresponds to a location of the positioning shaft 150 when the second plate piece 112 and the first plate piece 111 are unfolded to the predetermined angle. Preferably, the location of the groove 122 may be set to correspond to a location of the positioning shaft 150 when the second plate piece 112 and the first plate piece 111 are unfolded to 180 degrees. In this way, when the second plate piece 112 and the first plate piece 111 are unfolded until they are located on the same plane, the plate folding and unfolding device locks the two plate pieces.

Further, as shown in FIG. 5, a part of the structure of the plate folding and unfolding device of this embodiment is drawn separately. The connecting rod 140 may include a first connecting rod 141 and a second connecting rod 142. The first connecting rod 141 and the second connecting rod 142 are disposed symmetrically on two sides of the cam 120 and are respectively connected to two opposite ends of the rotating shaft 130. The connecting rod 140 may be a straight rod or may be a curved rod. A plate-type curved rod is used in this embodiment. A quantity of the connecting rod 140 is not limited to two, as described in this embodiment. One or more connecting rods may be used. In this embodiment, the elastic piece 160 is spring. One end of the spring is connected to the positioning shaft 150, and the other end is fixed to the connecting rod 140. Further, the plate folding and unfolding device further includes: a space disposed on the connecting rod 140 for accommodating the spring. The space extends, from a location of the positioning shaft 150 when the positioning shaft 150 is in the first state, by a specific length in a direction towards the first end of the connecting rod 140, and a side wall is provided at the terminal point of the extension. Correspondingly, the spring is an extension spring, one end of the extension spring is connected to the positioning shaft 150, and the other end is fixed to the side wall. The extension spring is in an extended state regardless whether the positioning shaft 150 is in the first state or the second state, so as to provide tensile force for the positioning shaft 150 to approach the side wall, that is, the rotating shaft 130. In the first state, the extension spring makes the positioning shaft 150 press closely against the outer peripheral surface 121 of the cam 120. In the second state, the extension spring pulls the positioning shaft 150 to the groove 122, to implement locking. In this embodiment, there are two of the spaces, which are distributed symmetrically on the first connecting rod 141 and the second connecting rod 142. The two spaces both run through two side faces of the connecting rod 140. The elastic piece 160 should not be limited to using a spring, and may be another elastic piece such as a spring plate, provided that the positioning shaft 150 fits closely to the outer peripheral surface 121 of the cam 120. The space is not limited to running through the two side faces of the connecting rod 140, and may alternatively extend inwards from one side face of the connecting rod 140 without penetrating the other side face.

The plate folding and unfolding device may further include: a stationary shaft 170, where the stationary shaft 170 fixes the second end of the connecting rod 140 to the second plate piece 112. Certainly, a manner of fixing the second end of the connecting rod 140 to the second plate piece 112 is not limited thereto. For example, in this embodiment, a second end of the second connecting rod 142 of the connecting rod may be directly welded to the second plate piece 112.

The plate folding and unfolding device of the present embodiments may be applied to fields such as the aerospace, signal, and computer fields. The plate may be a solar panel of a spacecraft, an antenna array substrate of an antenna, a laptop computer, or the like. When the plate is a solar panel of a spacecraft, the first plate piece 111 and the second plate piece 112 correspond to two panels that are connected to each other and that can be folded or unfolded. When the plate is an antenna array substrate, the first plate piece 111 and the second plate piece 112 correspond to two connected antenna array substrates. When the plate is a laptop computer, the first plate piece 111 and the second plate piece 112 correspond to the panel board on which the screen is located and the panel board the keyboard is located.

The plate folding and unfolding device of the present embodiments is not limited to connection of two plate pieces such as the first plate piece 111 and the second plate piece 112, and may implement multi-level connection of multiple plate pieces according to an actual requirement. As shown in FIG. 4, a connecting structure including three plate pieces is used as an example, such as, the right end of a first plate piece 111 and the right end of a second plate piece 112 is connected by using one plate folding and unfolding device, so that the first plate piece 111 and the second plate piece 112 fold, unfold, and lock around a rotating shaft 130; and the left end of the second plate piece 112 is connected to the left end of a third plate piece 113 by using another plate folding and unfolding device, so that the second plate piece 112 and the third plate piece 113 fold, unfold, and lock around a rotating shaft 130, thereby implementing multi-level connection of multiple plate pieces.

According to the plate folding and unfolding device of the present embodiments, the positioning shaft 150 is pressed closely to the outer peripheral surface 121 of the cam 120 by using the elastic piece 160, and the positioning shaft 150 can roll into the groove 122 on the outer peripheral surface 121 of the cam 120 when two connected plate pieces are unfolded to a predetermined angle, making locking much easier and a location more accurate. In addition, when cams of different sizes are used, the original connecting rod 140, positioning shaft 150, elastic piece 160, and the like can continue to be used without requiring modifying the entire plate folding and unfolding device, thereby reducing the design workload.

Figure 6:
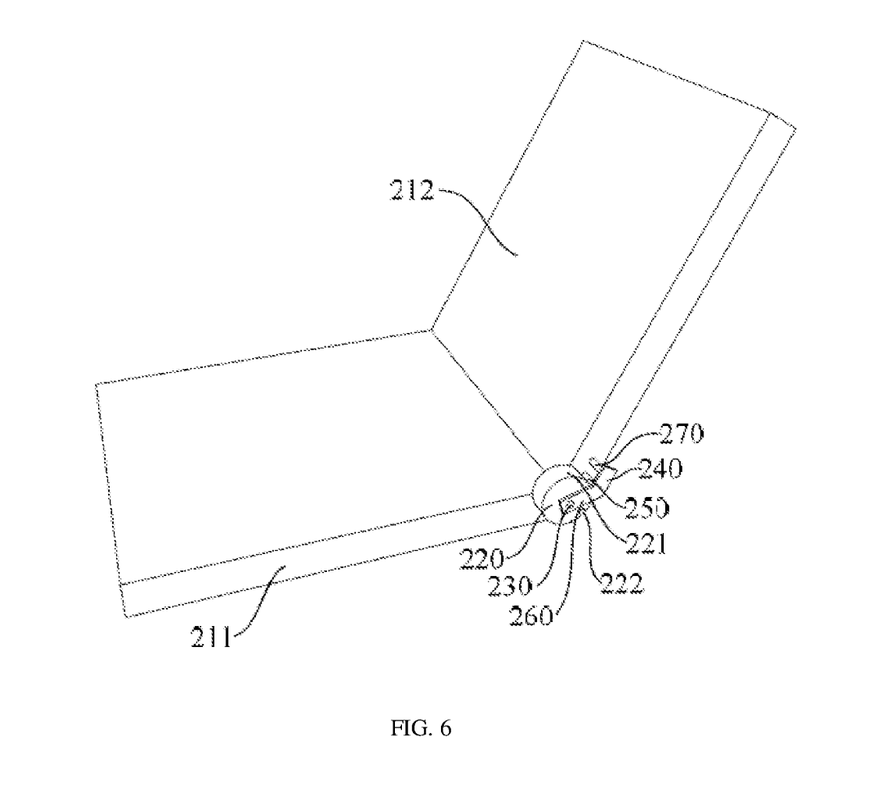
FIG. 6 shows a space diagram of a plate folding and unfolding device according to a second embodiment of the present embodiments when the device is unfolded.
Figure 7:
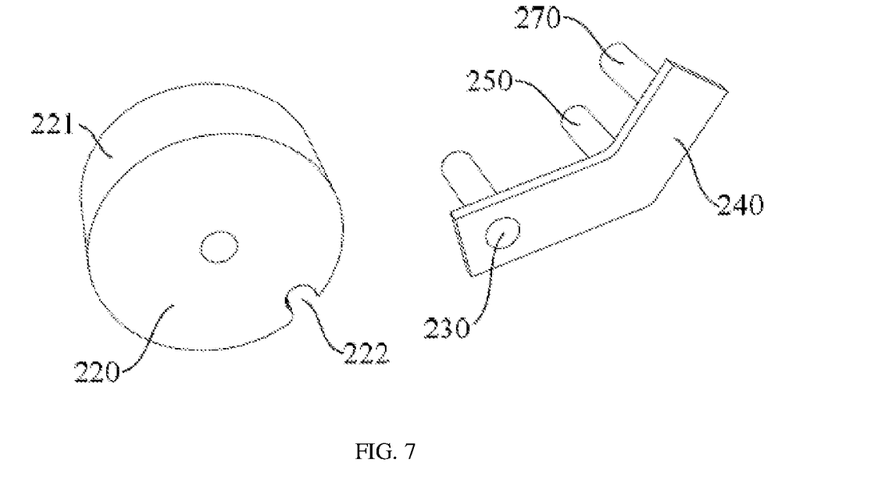
FIG. 7 and FIG. 8 show an exploded structural view of a plate folding and unfolding device according to a second embodiment of the present embodiments.
Figure 8:
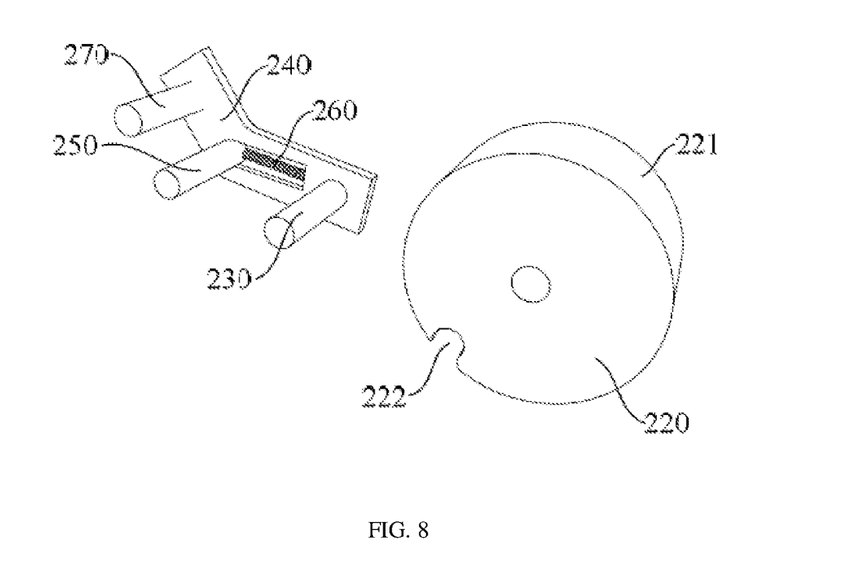

FIG. 6 to FIG. 8 shows space diagrams and exploded structural views of a plate folding and unfolding device according to a second embodiment of the present embodiments when the device is unfolded. The following describes differences of the second embodiment from the first embodiment of the present embodiments, and the similarities are not described herein again.

The plate folding and unfolding device includes: a cam 220, a connecting rod 240, a positioning shaft 250, an elastic piece 260, and a stationary shaft 270. The cam 220 is fixed to a first plate piece 211, and a rotating shaft 230 is disposed inside the cam 220 in an axial direction of the cam 220. The connecting rod 240 includes a first end and a second end that are opposite to each other, the first end is connected vertically to the rotating shaft 230, and the second end is fixed to a second plate piece 212 by using the stationary shaft 270, so that the second plate piece 212 and the first plate piece 211 fold or unfold around the rotating shaft 230. The positioning shaft 250 is disposed, parallel to the rotating shaft 230, on the connecting rod 240, and the positioning shaft 250 rotates along with the connecting rod 240 and can move back and forth in a radial direction of the cam 220. The elastic piece 260 uses an extension spring and is disposed on the connecting rod 240, and one end of the elastic piece 260 is connected to the positioning shaft 250, so that the positioning shaft 250 is pressed closely to an outer peripheral surface 221 of the cam 220, where a groove 222 that accommodates the positioning shaft 250 is disposed at at least one location of the outer peripheral surface 221 of the cam 220.

The difference from the first embodiment lies in that in this embodiment, there is only one connecting rod 240 and one extension spring. A space for accommodating the extension spring is still disposed on the connecting rod 240. The space extends, from a location of the positioning shaft 250 when the positioning shaft 250 is in a first state, by a specific length in a direction towards the first end of the connecting rod 240, and a side wall is provided at the terminal point of the extension. One end of the extension spring is connected to the positioning shaft 250, and the other end is fixed to the side wall. In this embodiment, the space does not run through two side faces of the connecting rod 240, but instead, extends a specific length inward starting from the side face of the connecting rod 240 facing the second plate piece 222, without penetrating the side face back to the second plate piece 222. In this way, an axial location of the positioning shaft 250 is limited, preventing the positioning shaft 250 from falling off.

In the plate folding and unfolding device according to the present embodiments, modifications to a shape and a size of the cam, a shape of the connecting rod, a manner of fixing the connecting rod to the second plate piece, selection of the elastic piece, and the quantity and locations of grooves on the outer peripheral surface of the cam, and the like may be presented in various variations. For example, on a basis of the foregoing first embodiment, a third embodiment is obtained by changing the shape of the connecting rod, selection of the elastic piece, and the quantity and locations of grooves on the outer peripheral surface of the cam.

Figure 9:
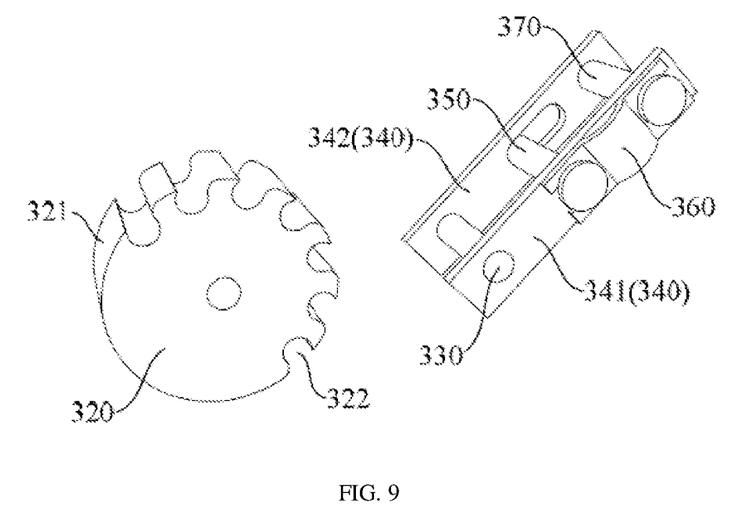
FIG. 9 shows an exploded structural view of a plate folding and unfolding device according to a third embodiment of the present embodiments.

FIG. 9 shows an exploded structural diagram of a plate folding and unfolding device according to the third embodiment of the present embodiments. The plate folding and unfolding device includes: a cam 320, a connecting rod 340, a positioning shaft 350, an elastic piece 360, and a stationary shaft 370. The cam 320 is fixed to a first plate piece, and a rotating shaft 330 is disposed inside the cam 320 in an axial direction of the cam 320. The connecting rod 340 includes a first end and a second end that are opposite to each other, the first end is connected vertically to the rotating shaft 330, and the second end is fixed to a second plate piece by using the stationary shaft 370, so that the second plate piece and the first plate piece fold or unfold around the rotating shaft 330. The positioning shaft 350 is disposed, parallel to the rotating shaft 330, on the connecting rod 340, and the positioning shaft 350 rotates along with the connecting rod 340 and can move back and forth in a radial direction of the cam 320. The elastic piece 360 is disposed on the connecting rod 340, and one end of the elastic piece 360 is connected to the positioning shaft 350, so that the positioning shaft 350 is pressed closely to an outer peripheral surface 321 of the cam 320, where a groove 322 that accommodates the positioning shaft 350 is disposed at at least one location of the outer peripheral surface 321 of the cam 320.

In this embodiment, multiple grooves 322 are disposed at different locations on the outer peripheral surface 321 of the cam 320, so that locking can be implemented when the first plate piece and the second plate piece are folded or unfolded to different corresponding locations, to meet the requirement of unfolding to different angles. In addition, a first connecting rod 341 and a second connecting rod 342 of the connecting rod 340 of this embodiment are both plate-type straight rods. The elastic piece 360 uses a spring plate, and the spring plate is disposed on one side of the connecting rod 340. One end of spring plate is connected to the positioning shaft 350, and the other end abuts against the stationary shaft 370. The spring plate is in a compressed state regardless whether the positioning shaft 350 is in a first state or a second state, to provide elastic force that drives the positioning shaft 350 away from the stationary shaft 370. In the first state, the spring plate pushes the positioning shaft 350 toward a direction of the rotating shaft 330, so that the positioning shaft 350 fits closely to the outer peripheral surface 321 of the cam 320. In the second state, the spring plate pushes the positioning shaft 350 into the groove 322, to implement locking.

In the plate folding and unfolding device according to this embodiment, multiple grooves 322 are disposed at different location on the outer peripheral surface 321 of the cam 320, so that there are locking locations for multiple angles of unfolding of two plate pieces connected by using the plate folding and unfolding device, achieving richer applicability. The positioning shaft 350 is pressed closely to the outer peripheral surface 321 of the cam 320 by using the elastic piece 360, and the positioning shaft 350 can roll into the groove 322 on the outer peripheral surface 321 of the cam 320 when two connected plate pieces are unfolded to a predetermined angle, making locking much easier and a location more accurate. In addition, when cams of different sizes are used, the original connecting rod 340, positioning shaft 350, elastic piece 360, and the like can continue to be used without requiring modifying the entire plate folding and unfolding device, thereby reducing the design workload.

The present embodiment further provides a solar panel structure, applied to a spacecraft and includes: a first panel; a second panel; and the plate folding and unfolding device according to any of the foregoing embodiments of the present embodiments. The cam of the plate folding and unfolding device is fixed to the first panel, and the second end of the connecting rod is fixed to the second panel. In this way, the second panel and the first panel fold or unfold around the rotating shaft, locking at a predetermined angle is implemented, where locking is much easier, and a locking location is more accurate. When the solar panel structure is designed, the plate folding and unfolding device does not need to be modified entirely when the size of the cam is changed, featuring more convenient design and saving costs.

It should be noted that in this application, relational terms such as first and second are merely used to distinguish one entity or operation from another entity or operation, and do not necessarily require or imply that any actual relationship or sequence of this type exist between these entities or operations. In addition, terms such as "include" and "comprise" or any variants thereof are intended to cover non-exclusive exclusion. Therefore, a process, a method, an object, or a device that includes a series of elements includes not only these elements and may further include other elements that are not clearly listed or may further include elements inherent to the process, the method, the object, or the device. If there is no further limitation, an element limited by a statement "including one" does not exclude that another same element may be further included in the process, method, object, or device that includes the element.

According to the foregoing descriptions of the embodiments of the present embodiments, these embodiments do not describe all the specifics in detail, and the present embodiments is also not limited to only the described specific embodiments. Apparently, many modifications and changes can be made according to the foregoing descriptions. This specification selects and describes in detail these embodiments in order to better explain the principle and actual application of the present embodiments, so that persons skilled in the art can better use the present embodiments and make modifications and make use based on the present embodiments. The present embodiment is merely limited by the claims and the entire scope and equivalents thereof.

The invention claimed is:

1. A plate folding and unfolding device, comprising:
a cam, wherein the cam is fixed to a first plate piece, and a rotating shaft is disposed inside the cam in an axial direction of the cam;
a connecting rod, wherein the connecting rod comprises a first end and a second end that are opposite to each other, the first end is connected vertically to the rotating shaft, and the second end is fixed to a second plate piece, so that the second plate piece and the first plate piece fold or unfold around the rotating shaft;
a positioning shaft, wherein the positioning shaft is disposed, parallel to the rotating shaft, on the connecting rod, and the positioning shaft rotates along with the connecting rod and can move back and forth in a radial direction of the cam; and
an elastic piece, wherein the elastic piece is disposed on the connecting rod, one end of the elastic piece is connected to the positioning shaft, so that the positioning shaft fits closely to an outer peripheral surface of the cam, wherein
a groove that accommodates the positioning shaft is disposed at at least one location of the outer peripheral surface of the cam.

2. The plate folding and unfolding device according to claim 1, wherein the positioning shaft comprises a first state in which the positioning shaft fits closely to the outer peripheral surface of the cam and a second state in which the positioning shaft is located in the groove; and
when the second plate piece and the first plate piece are completely folded, the positioning shaft is in the first state; or when the second plate piece and the first plate piece are unfolded to a predetermined angle, the positioning shaft is in the second state; and the location of the groove corresponds to a location of the positioning shaft when the second plate piece and the first plate piece are unfolded to the predetermined angle.

3. The plate folding and unfolding device according to claim 2, wherein the location of the groove corresponds to a location of the positioning shaft when the second plate piece and the first plate piece are unfolded to 180 degrees.

4. A solar panel structure, disposed in a spacecraft and comprising:
a first panel;
a second panel; and
the plate folding and unfolding device according to claim 3, wherein the cam of the plate folding and unfolding device is fixed to the first panel, and the second end of the connecting rod is fixed to the second panel, so that the second panel and the first panel fold or unfold around the rotating shaft.

5. The plate folding and unfolding device according to claim 2, wherein the elastic piece is a spring, one end of the spring is connected to the positioning shaft, and the other end is fixed to the connecting rod.

6. The plate folding and unfolding device according to claim 5, further comprising: a space disposed on the connecting rod for accommodating the spring, wherein the space extends, from a location of the positioning shaft when the positioning shaft is in the first state, by a specific length in a direction towards the first end of the connecting rod, and a side wall is provided at the terminal point of the extension; and the spring is an extension spring, one end of the extension spring is connected to the positioning shaft, and the other end is fixed to the side wall.

7. A solar panel structure, disposed in a spacecraft and comprising:
a first panel;
a second panel; and
the plate folding and unfolding device according to claim 6, wherein the cam of the plate folding and unfolding device is fixed to the first panel, and the second end of the connecting rod is fixed to the second panel, so that the second panel and the first panel fold or unfold around the rotating shaft.

8. A solar panel structure, disposed in a spacecraft and comprising:
a first panel;
a second panel; and
the plate folding and unfolding device according to claim 5, wherein the cam of the plate folding and unfolding device is fixed to the first panel, and the second end of the connecting rod is fixed to the second panel, so that the second panel and the first panel fold or unfold around the rotating shaft.

9. A solar panel structure, disposed in a spacecraft and comprising:
a first panel;
a second panel; and
the plate folding and unfolding device according to claim 2, wherein the cam of the plate folding and unfolding device is fixed to the first panel, and the second end of the connecting rod is fixed to the second panel, so that the second panel and the first panel fold or unfold around the rotating shaft.

10. The plate folding and unfolding device according to claim 1, further comprising:
a stationary shaft, wherein the stationary shaft fixes the second end of the connecting rod to the second plate piece.

11. The plate folding and unfolding device according to claim 10, wherein the elastic piece is a spring plate, the spring plate is located on one side of the connecting rod, one end of the spring plate is connected to the positioning shaft, and the other end abuts against the stationary shaft.

12. A solar panel structure, disposed in a spacecraft and comprising:
a first panel;
a second panel; and
the plate folding and unfolding device according to claim 11, wherein the cam of the plate folding and unfolding device is fixed to the first panel, and the second end of the connecting rod is fixed to the second panel, so that the second panel and the first panel fold or unfold around the rotating shaft.

13. A solar panel structure, disposed in a spacecraft and comprising:
a first panel;
a second panel; and
the plate folding and unfolding device according to claim 10, wherein the cam of the plate folding and unfolding device is fixed to the first panel, and the second end of the connecting rod is fixed to the second panel, so that the second panel and the first panel fold or unfold around the rotating shaft.

14. The plate folding and unfolding device according to claim 1, wherein the connecting rod comprises a first connecting rod and a second connecting rod, and the first connecting rod and the second connecting rod are disposed symmetrically on two sides of the cam and are respectively connected to two opposite ends of the rotating shaft.

15. A solar panel structure, disposed in a spacecraft and comprising:
 a first panel;
 a second panel; and
 the plate folding and unfolding device according to claim 14, wherein the cam of the plate folding and unfolding device is fixed to the first panel, and the second end of the connecting rod is fixed to the second panel, so that the second panel and the first panel fold or unfold around the rotating shaft.

16. The plate folding and unfolding device according to claim 1, wherein an outline of an axial cross section of the cam is in any one of a round shape, an oval shape, or an involute shape.

17. A solar panel structure, disposed in a spacecraft and comprising:
 a first panel;
 a second panel; and
 the plate folding and unfolding device according to claim 16, wherein the cam of the plate folding and unfolding device is fixed to the first panel, and the second end of the connecting rod is fixed to the second panel, so that the second panel and the first panel fold or unfold around the rotating shaft.

18. The plate folding and unfolding device according to claim 1, wherein the plate is one of a solar panel, an antenna array substrate, or a laptop computer.

19. A solar panel structure, disposed in a spacecraft and comprising:
 a first panel;
 a second panel; and
 the plate folding and unfolding device according to claim 1, wherein the cam of the plate folding and unfolding device is fixed to the first panel, and the second end of the connecting rod is fixed to the second panel, so that the second panel and the first panel fold or unfold around the rotating shaft.

* * * * *